(12) United States Patent
Kopylov et al.

(10) Patent No.: US 10,402,584 B1
(45) Date of Patent: Sep. 3, 2019

(54) SYSTEM AND METHOD FOR TRANSLATING SECURITY OBJECTIVES OF COMPUTER SOFTWARE TO PROPERTIES OF SOFTWARE CODE

(71) Applicant: HRL Laboratories, LLC, Malibu, CA (US)

(72) Inventors: Alexei Kopylov, Pasadena, CA (US); Aleksey Nogin, Fresno, CA (US); George Kuan, Westlake Village, CA (US)

(73) Assignee: HRL Laboratories, LLC, Malibu, CA (US)

(*) Notice: Subject to any disclaimer, the term of this patent is extended or adjusted under 35 U.S.C. 154(b) by 353 days.

(21) Appl. No.: 15/284,149

(22) Filed: Oct. 3, 2016

Related U.S. Application Data

(60) Provisional application No. 62/235,804, filed on Oct. 1, 2015.

(51) Int. Cl.
*G06F 21/62* (2013.01)

(52) U.S. Cl.
CPC .................. *G06F 21/6245* (2013.01)

(58) Field of Classification Search
CPC .................................... G06F 21/6245
USPC ............................................. 726/1
See application file for complete search history.

(56) References Cited

U.S. PATENT DOCUMENTS

| 10,122,759 | B2* | 11/2018 | Kiehtreiber | G06F 21/51 |
| 2005/0257243 | A1* | 11/2005 | Baker | G06F 21/554 726/1 |
| 2014/0208431 | A1* | 7/2014 | Archer | G06F 21/577 726/25 |
| 2015/0106873 | A1* | 4/2015 | Marsh | G06Q 10/0635 726/1 |
| 2016/0098562 | A1* | 4/2016 | Hawblitzel | G06F 8/41 726/22 |
| 2017/0126741 | A1* | 5/2017 | Lang | G06F 21/57 |

OTHER PUBLICATIONS

Heitmeyer et al. IEEE Transactions on Software Engineering, vol. 34, No. 1, Jan./Feb. 2008 "Applying Formal Methods to a Certifiably Secure Software" p. 82-98 (Year: 2008).*
Arora et al. IEEE Transactions on Very Large Scale Integration (VLSI) Systems, vol. 15, No. 5, May 2007; "Architectural Support for Run-Time Validationof Program Data Properties" p. 546-559 (Year: 2007).*
Ross Anderson. "Why cryptosystems fail." In Proceedings of the 1st ACM conference on Computer and communications security, CCS '93, pp. 215-227, New York, NY, USA, 1993. ACM.
Gartner. "Gartner says security software market is poised for 11 percent growth in 2010." Gartner Press Release, 2010, pp. 1-3.

(Continued)

*Primary Examiner* — Khalil Naghdali
(74) *Attorney, Agent, or Firm* — Tope-McKay & Associates

(57) ABSTRACT

Described is a system for translating security objectives to properties of software code. The system receives a software code and a description of user security objectives written in a high-level language. Using a set of inference rules, the user security objective is translated into a formal security objective. The formal security objective is adapted into a low-level property to fit a target program having software code. Finally, it is determined whether the user objective has been satisfied by analyzing the software code with respect to the low-level property.

21 Claims, 3 Drawing Sheets

(56) References Cited

OTHER PUBLICATIONS

Nathaniel Gray, Jason Hickey, Aleksey Nogin, and Cristian Tapus. "Building extensible compilers in a formal framework. A formal framework user's perspective." In Konrad Slind, editor, Emerging Trends. Proceedings of the 17th International Conference on Theorem Proving in Higher Order Logics (TPHOLs 2004), pp. 57-70. University of Utah, 2004.

Jason Hickey and Aleksey Nogin. "Extensible hierarchical tactic construction in a logical framework." In Konrad Slind, Annette Bunker, and Ganesh Gopalakrishnan, editors, Proceedings of the 17th International Conference on Theorem Proving in Higher Order Logics (TPHOLs 2004), vol. 3223, pp. 136-151. Springer-Verlag, 2004.

Jason Hickey and Aleksey Nogin. "Formal compiler construction in a logical framework." Higher-Order and Symbolic Computation, 19(2-3): pp. 197-230, Sep. 2006.

Jason Hickey, et al., "MetaPRL—A modular logical environment." In David Basin and Burkhart Wolff, editors, Proceedings of the 16th International Conference on Theorem Proving in Higher Order Logics (TPHOLs 2003), vol. 2758 of LNCS, pp. 287-303. Springer-Verlag, 2003.

Jason Hickey, Aleksey Nogin, and Alexei Kopylov. "The MetaPRL user guide." URL: http://metaprl.org/user-guide/default.html. Downloaded Oct. 10, 2016.

C.T. Leondes. "Expert systems: the technology of knowledge management and decision making for the 21st century." No. v. 6 in Expert Systems: The Technology of Knowledge Management and Decision Making for the 21st Century. Academic Press, 2002. Chapter 48 "Structuring Expert Control Using the Integrated Process Supervision Architecture" by C. Quek, M. Pasquier, and P. W. Ng, Part IV, pp. 1797-1806.

Gary McGraw. "Software [in]security: Software security crosses the threshold." informIT, 2010, pp. 1-6.

Aleksey Nogin and Jason Hickey. "Sequent schema for derived rules." In Victor A. Carreno, Cezar A. Munoz, and Sophiene Tahar, editors, Proceedings of the 15th International Conference on Theorem Proving in Higher Order Logics (TPHOLs 2002), vol. 2410, pp. 281-297. Springer-Verlag, 2002.

Robert M. O'Keefe and Daniel E O'Leary. "Expert system verification and validation: a survey and tutorial." Artificial Intelligence Review, 7: pp. 3-42, 1993.

\* cited by examiner

SYSTEM AND METHOD FOR TRANSLATING SECURITY OBJECTIVES OF COMPUTER SOFTWARE TO PROPERTIES OF SOFTWARE CODE

CROSS-REFERENCE TO RELATED APPLICATIONS

This is a non-provisional application of U.S. Provisional Application No. 62/235,804, filed on Oct. 1, 2015, the entirety of which is incorporated herein by reference.

FIELD OF INVENTION

The present invention relates to a security analysis system and, more particularly, to a system for translating security objectives to software code.

BACKGROUND OF INVENTION

Typically, software analysts have some security objectives in mind and want to verify that the software meets these objectives. In order to do this, a security analyst would typically analyze the source code or the binary code using some tools, such as static analysis or formal verification. It is well-known that there is a gap between these informal security objectives and the formal properties that can be verified using these tools. In other words, the property that the analyst actually checks using these tools could differ from the security objectives that she intended to verify. In order to be confident in her results, the analyst needs to ensure that the verified formal properties imply the intended security objectives. Often, the reasoning behind this step would exist only in the analyst's head and is lost after the verification. Similarly, the security objective itself is often lost. Only formal properties are left. Unfortunately, it is difficult to read the formal properties and to understand the connection between desired informal properties and verifiable formal ones. Therefore, it is hard to recheck the software and there is no way to confirm that the low-level properties actually match the high-level objective.

Thus, a continuing need exists for a system that fills the gap between high-level informal desired security properties and low-level formal verifiable properties, thereby enabling an analyst to verify that a particular software application meets desired security objectives.

SUMMARY OF INVENTION

This disclosure provides a system for translating security objectives to properties of software code. The system receives a software code and a description of user security objectives written in a high-level language. Using a set of inference rules, a user security objective written in a high-level language is translated into a formal security objective. The formal security objective is adapted into a low-level property to fit a target program having software code. It is then determined whether the user objective has been satisfied by analyzing the software code with respect to the low-level property.

In an aspect, the set of inference rules are predefined or from a user supplied library.

In another aspect, the set of inference rules are rules for translating properties, rules for proving properties, or rules for compiling software.

Further, in using a set of inference rules, the formal security objective is a low-level representation of the user security objectives.

Additionally, determining whether the user objective has been satisfied includes determining if the set of inference rules lead from the high-level language to the low-level representation.

In yet another aspect, translating the user security objective into a formal security objective and adapting the formal security objective into a low-level property includes translating a high level property into different sets of low-level properties for different target programs.

Additionally, translating the user security objective into a formal security objective further includes adding annotations to the set of inference rules.

In another aspect, adding annotations to the set of inference rules includes adding an AutoMustComplete rule, designating that if the system does have access to sensitive data that it does not reveal the sensitive data.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
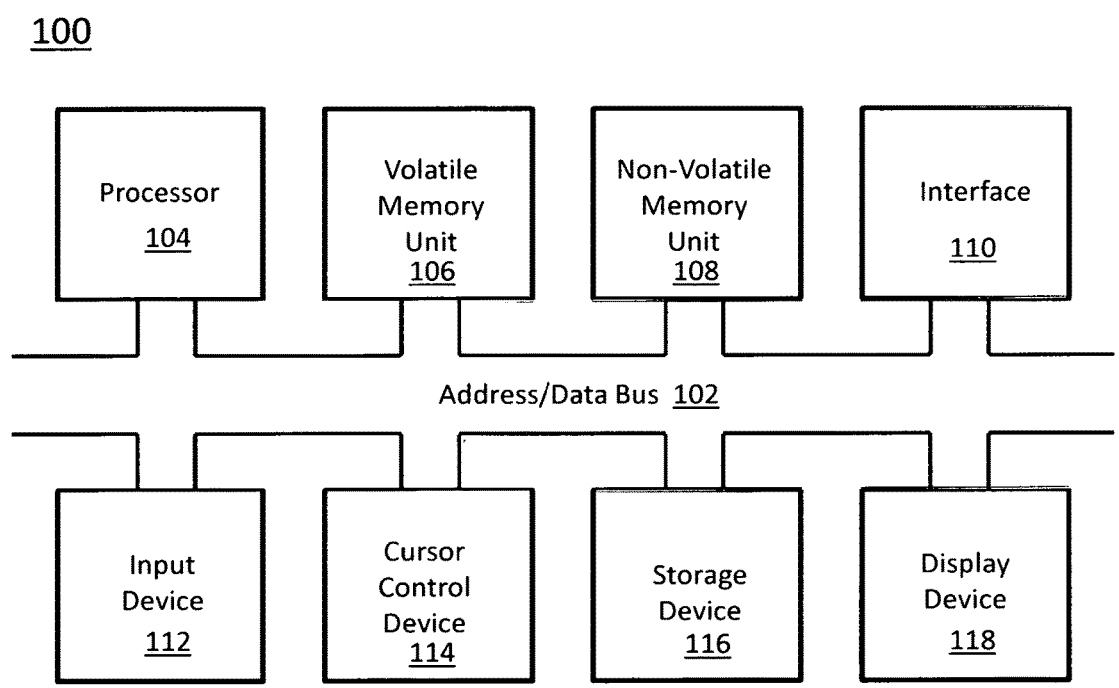
FIG. 1 is a block diagram depicting the components of a system according to various embodiments of the present invention.

The present invention relates to a security analysis system and, more particularly, to a system for system for translating security objectives to software code. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a description of the various principal aspects of the present invention is provided. Subsequently, an introduction provides the reader with a general understanding of the present invention. Finally, specific details of the present invention are provided to give an understanding of the specific aspects.

(1) Principal Aspects

The present invention has three "principal" aspects. The first is security analysis system. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
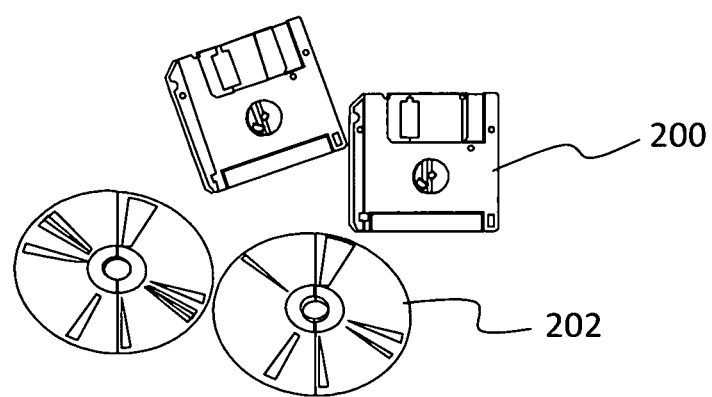
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Introduction

Described is a technique for translating security objectives of computer software to the formal properties of the code that could be further verified by formal verification methods and/or using static analysis tools. The technique provided by the system provides a new approach to the well-known problem of the semantic gap between desired informal security properties of the software and the formally verifiable specification. The system accomplishes this goal through a unique application of existing formal theorem proving/automated reasoning technology. Traditionally, theorem provers are used to reason about formal theorems. The system described herein enables using theorem provers to reason about informal properties, some mixture of formal and informal properties, as well as translating informal properties to formal ones. The invention facilitates the analysis of software for bug and malware detection and for ensuring that the software satisfies the desired security properties.

The approach captures informal reasoning that leads an analyst to the low level properties. This provides a formal audit trail for informal reasoning which allows rechecking the property at a later point. For example, one might desire to recheck the property if a new version of software is available, or if some security objectives have changed. The audit trail also allows for examination if there is a doubt about the connection between the high security objectives and the low level formal property of the code.

Additionally, the system includes an extensible property language for writing high-level and low-level properties, which reduces the need for manual analyst input and configuration overhead. Further, the system uses pre-constructed property libraries as well as the library of translation rules. These libraries are adaptable, which allows one to decrease the missed detection rate. Further, the system also allows one to easily modify the compiler when a new kind of attack is found and check what application could be affected (3) Specific Details of the Invention The system described herein is based on the formal theorem prover technology. A library of translation rules is defined as a theory in the theorem prover. In this library, each transformation rule is postulated as an axiom in the formal prover. An analyst analyzes the program by applying these rules to the goal step-by-step. This can be done by hand or using the tactics (proof search procedures)—either those supplied with the theorem prover, or custom-built for the objective to policy translation. As a result one eventually constructs a "proof", which consists of a set of rules that were applied. This proof is saved and can be examined or reconstructed later.

Figure 3:
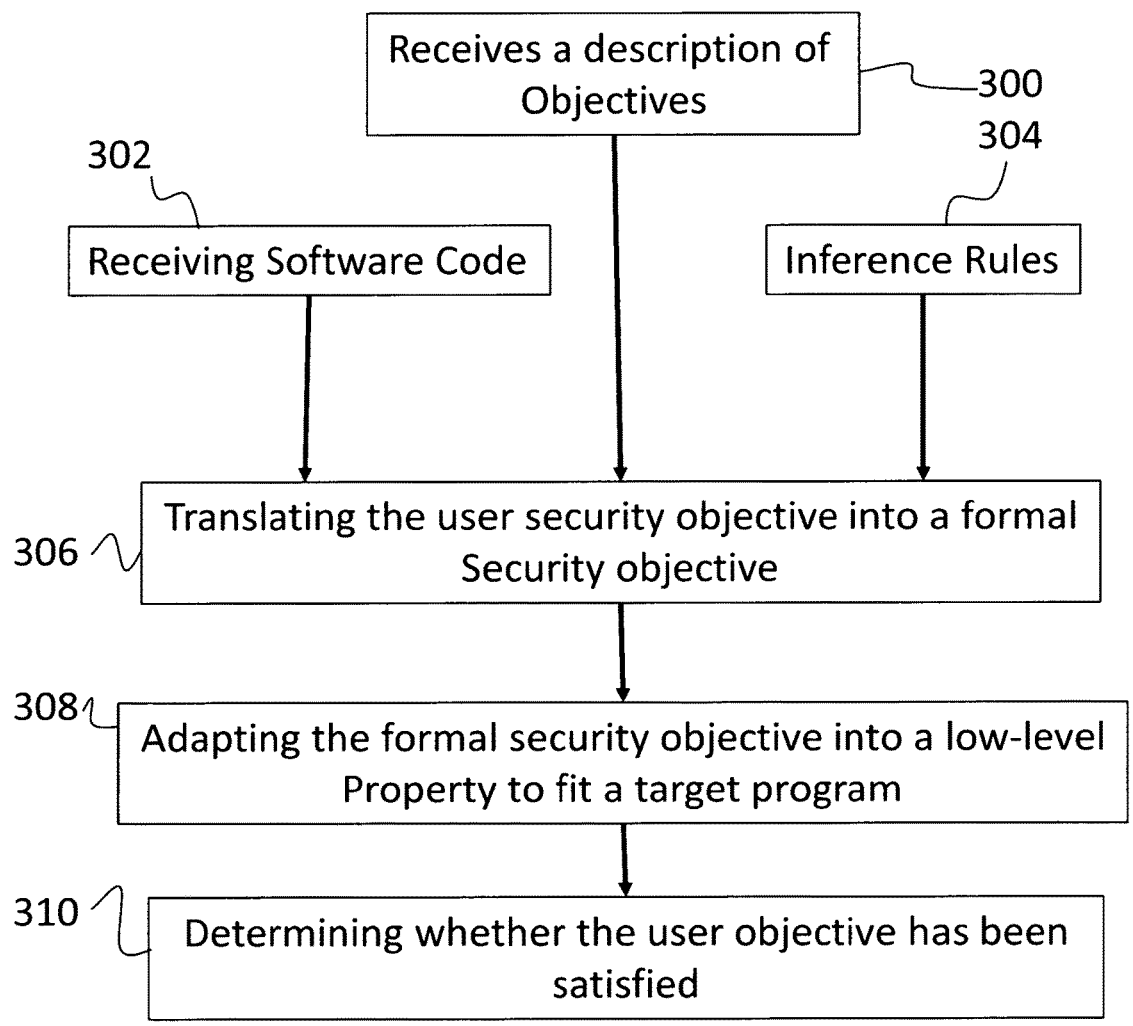
FIG. 3 is flowchart illustrating a process for translating security objectives according to various embodiments of the present invention.

During operation and as shown in FIG. 3, the system receives a description of objectives 300 written in a high-level language from a user. Next, software code is received 302 from the user. A set of inference rules 304 are also received from a predefined or user supplied library. The rules, for example, may be of the following types: rules for translating the properties, rules for proving the properties, and rules for compiling software. The set of inference rules are applied to the user's security objective, resulting in a formal representation of the user security objective (i.e., into a formal security objective). In other words using the set of inference rules, a user security objective written in a high-level language is translated 306 into a formal security objective. The formal security objective is adapted 308 into a low-level property to fit a target program having software code. Then it is determined 310 whether the user objective has been satisfied by analyzing the software code with respect to the low-level property.

Thus, a theorem prover is used to define the formal specification language in which formal properties of the program are described. The software code is checked against the formal objective to determine if the software code satisfies the objectives (e.g., by analyzing, for example, the reasoning that leads from the high-order objective to the low-level properties). If so, for example, rules can be applied for compiling the software code into an executable format. Each of these aspects are described in further detail below.

(3.1) Architecture

The translation approach, embodied in a translation tool, works through a synergistic combination of the innovative top-down security property compilation process, which translates high-level informal security objectives to low-level machine-verifiable properties, and bottom-up low-level program analysis, which extracts program-specific characteristics from the target program. The translation is one-to-many in the sense that a single objective translates to sets of machine-verifiable properties, which must be satisfied by the target program in order to reach the objective. Thus, this security objective translation tool automatically tailors properties to each target program by translating a high level property into different sets of low-level properties for different programs to avoid manual specification and imprecision in conventional security analyses due to the semantic gap between the actual and formal security specifications for a program. For example, a property such as "this application does not reveal a user's location to Internet" may be translated to "this application does not upload anything to the Internet" for one application, and to "this application does not have access to GPS coordinates" for another one, and to an information flow statement for an application that has access both to GPS and to Internet. The property compilation process provides an unprecedented level of automation and flexibility in the security property specification process to greatly cut down on the amount of required analyst time.

A hierarchical library of security properties and proof rules will drive the compilation process. In contrast to prior approaches that use a single low-level property specification language, the property library is hierarchical, where each property can be defined at different, more appropriate levels of abstraction ranging from the high-level objective to the machine-verifiable properties, expressed in first-order propositional logic. The proof rules are defined using a technical formalism called a term rewriting system relation between these properties. Analysts may extend this library to specify the properties to be verified at whichever level of abstraction is deemed most appropriate. Program-specific characteristics extracted from the program source through program analysis (e.g., dependency, control flow, and data flow graphs) and properties specified by the analyst help guide the property compilation and program analysis respectively.

(3.2) Theorem Prover

The property compilation process is similar to the formal theorem proving, except for the fact that the high-level properties do not have formal semantics. As a non-limiting example, the MetaPRL theorem prover can be used for property compilation where existing top-down and bottom-up proof-search heuristics in MetaPRL guide property compilation. The MetaPRL theorem prover, an open source tool, is well suited for the following reasons. First, MetaPRL is designed as a logical framework; it can be used for any logic even without formal semantics. Second, MetaPRL is already successfully used for formal compilation in the context of compiler implementation. Third, MetaPRL has a straightforward and easy way to tell automated heuristic how to apply a given rule. Finally, the MetaPRL proof engine supports easy proof reuse in the case that some variable changes.

(3.3) Tactics and Rule Annotations

The theorem prover provides tactics that can be used to automate part of the verification process. These tactics can verify the properties that are straightforward to verify or can help an analyst by highlighting the place of the software code that needs to be verified to check a particular property.

The tactics are extensible. In particular, new rules may automatically increase the power of the existing tactics. In order to tell tactics what rules should be applied, the rules have special annotations. Examples of such annotations were described by Jason Hickey and Aleksey Nogin, in "Extensible hierarchical tactic construction in a logical framework," In Konrad Slind, Annette Bunker, and Ganesh Gopalakrishnan, editors, Proceedings of the 17$^{th}$ International Conference on Theorem Proving in Higher Order Logics (TPHOLs 2004), volume 3223, pages 136-151, Springer-Verlag, 2004, which is incorporated by reference as though fully set forth herein. These annotations help tactics learn what kind of rules should be applied in different situations. These simple tools allow analysts to add new rules to the system, and these new rules would be immediately available for use by the existing tactics.

(3.4) Implementation

The core of the technique is the method of formally capturing the informal reasoning that the analyst of a code does while verifying code. Generally, an analyst has code to verify and a set of informal objectives (i.e., properties that the code must satisfy). The analyst has a tool capable of verifying certain formal properties. His task is to translate this informal properties into formal ones.

The system described herein helps to formalize this reasoning and automate it. To do this, one should do the following. First, one should formalize the programming language in high-order abstract syntax following normal procedures for encoding programming languages in theorem provers. Thus, the system receives a formal description of a programing language from a user. Examples of such procedures for formalizing a programming language were described by Nathaniel Gray, Jason Hickey, Aleksey Nogin, and Cristian Tapus, in "Building extensible compilers in a formal framework. A formal framework user's perspective," In Konrad Slind, editor, Emerging Trends, at the Proceedings of the 17th International Conference on Theorem Proving in Higher Order Logics (TPHOLs 2004), pages 57-70, University of Utah, 2004, and by Jason Hickey and Aleksey Nogin, in "Formal compiler construction in a logical framework," Higher-Order and Symbolic Computation, 19(2-3): 197-230, September 2006, both references of which are hereby incorporated by reference as though fully set forth herein.

Next, one defines in a theorem prover the formal specification language in which formal properties of the program are described. These properties may be verified by other tools such as static analysis tools. This language is usually already defined in the verification tools that the analyst intends to use, therefore this definition should be a straightforward translation of this definition in the theorem prover.

Thereafter, one should analyze the reasoning that leads the analyst from the high-order objective to the low-level properties and separate this reasoning into small steps. Each step can be then rewritten as an inference rule in a theorem prover. For example, if the analyst believes that to check A, it is sufficient to check $B_1, B_2, \ldots, B_n$ then one needs to add a rule that says:

$$B_1 \to B_2 \to, \ldots B_n \to A$$

In order to do that, it is desirable to extend a language with new terms that represent the properties of a higher level that were defined before. One does this by declaring the properties as new primitive valid terms without giving a specific semantics for them.

Note that the properties A, Bi may need to have premises, subterms and bound variables. Standard high-order sequent calculus can be used to write these rules. Such a process of rule derivation was described by Aleksey Nogin and Jason Hickey, in "Sequent schema for derived rules," In Victor A. Carreno, Cezar A. Munoz, and Sophiene Tahar, editors, Proceedings of the 15$^{th}$ International Conference on Theorem Proving in Higher Order Logics (TPHOLs 2002), volume 2410, pages 281-297. Springer-Verlag, 2002, which is hereby incorporated by reference as though fully set forth herein.

After the inference rules are written as a library, analysts can use these rules to translate (i.e., applying the inference rules to the objectives 306) high-level properties for different programs. Note that one property can be translated to different low-level properties depending on the source code.

This can be achieved by adding annotations to the inference rule. Consider a very simple example: the property "the application does not reveal the GPS position", may be translated to the property "the application does have access to the GPS position" if the heuristic can actually prove that this particular application does not obtain any information from the GPS receiver. To do this one may add the special annotation AutoMustComplete to the rule that say "if the application does have access to the GPS position (i.e., sensitive data) then it does not reveal the GPS position (i.e., sensitive data)". This annotation says to the proof engine that this rule must be applied only when the auto tactic may complete proving that an application does not access to the GPS position (e.g., sensitive data). A more complicated example is when an application does access the GPS position, but does not reveal it to untrusted sources. In such a case, the proof tactic may examine the source code to find a function that accesses GPS position and then checks that the output of this function is not leaked. This is done using the information-flow techniques.

More precisely, the tool is implemented as a formal theory in a theorem prover environment. This formal theory consists of implementing the following steps:
1. Providing a formal description of a programming language;
2. Providing a description of a formal specification language that can be verified by other tools (such as Coq's calculus of inductive constructions (CIT) or SMT-LIB);
3. Providing a description of the language of the properties for different abstract levels (i.e., a high-level language for describing objectives as well as intermediate languages);
4. Providing a set of inference rules for translating properties, these rules may have annotations that state how these rules may be used; and
5. Automatically guiding translation of the properties.

The formal specification language and the programming language do have formal semantics. It is not necessary to define these semantics in the theorem prover; however, defining such semantics may be used to verify the correctness of the tool itself (for example for proving inconsistency of such language).

The language for describing objectives is also defined in high-order abstract syntax. This language does not have formal semantics. This language is defined just by declaring terms that corresponds to different properties (such as high-level and low-level). An example of a high-level language may be a first-order propositional logic with predefines terms for security objectives, such as "the application does not reveal the GPS position". A low-level language is a formal language with well-defined semantics, such as CIT or SMT-LIB. Basically each property corresponds to a term. These terms have a program code as subterms. It also may have bound variables. Bound variables are variables that do not represent values outside a formula, but used with a binding operator, such as quantifier or lamda-expression. For example, the variable x is bound in the expression $\lambda x.x$.

The semantics of the properties is described by the translation rules that defines translation of the high-order objective to low-level properties. Each translation rule is defined as an inference rule in the theorem prover. Each rule defines a legal translation step. Translation rules are built using the intuition about the meaning of a formal property.

In general, rules are applied by tactics. The tactics may be general and supplied by the theorem prover or may be more specific and supplied as a separate library. Tactics may learn how to apply the translation rules using annotations that are provided with the rules. Each annotation says what tactics may use a particular rule and under which conditions. For example, an annotation may say that a rule may be used by the Auto tactic or that a rule may be automatically used only when the auto tactic will complete the proof after the translation. This method allows one to make tactics that use sophisticated heuristics to automate the translation. This is done in the same way it was done for automation of a theorem prover, as described by Jason Hickey, Aleksey Nogin, Robert L. Constable, Brian E. Aydemir, Eli Barzilay, Yegor Bryukhov, Richard Eaton, Adam Granicz, Alexei Kopylov, Christoph Kreitz, Vladimir N. Krupski, Lori Lorigo, Stephan Schmitt, Carl Witty, and Xin Yu, in "MetaPRL—A modular logical environment," In David Basin and Burkhart Wolff, editors, Proceedings of the 16th International Conference on Theorem Proving in Higher Order Logics (TPHOLs 2003), volume 2758 of LNCS, pages 287-303, Springer-Verlag, 2003, which is hereby incorporated by reference as though fully set forth herein.

It is known that in theorem provers, tactics may be applied differently to different contexts. The same technique can be used to define translations that are applied differently in different contexts. Thus, the system may obtain a different translation of a single property for different code. The translations of high-level properties are saved as a proof by the theorem prover. These proofs may be viewed by the standard theorem prover editors. Also, the standard theorem prover allows one to reconstruct the proof in the case of a minor change in the source code or in a specification.

This approach provides a formal audit trail for informal reasoning, which leads to better assurance that a given program is not malicious. Often, it is difficult to determine what desired properties these specifications or annotations infer and why. By preserving the hierarchy between high-level objectives and low-level properties through a trace of the property compilation, the approach makes it straightforward for another analyst who is not familiar with the program to recheck the program. The possibility of independent audit reduces the missed detection rate.

Because the translation of high-level to low-level properties is preserved in the form of a trace of proof rules, a new version of a program can be rechecked automatically without needing to revise the low-level specification or re-annotating the new code. In the cases where a particular high- or low-level property is broken, the translation tool only needs enough manual input to revise this particular property, which amounts to considerable savings of analyst time. Because property transformation rules can be applied to multiple objectives and target programs, there is much opportunity to reuse these rules.

When a particular rule is found to be insecure (e.g., a new type of attack that was not covered by the previous analysis or by a previously used security model), this rule can be easily updated. The translation tool can determine which applications were verified using this rule and recheck them using a replacement rule supplied by the analyst. During compilation, the high-level property can be rewritten into a low-level one that better matches the target program. This reduces the rate of false alarms considerably as well as missed detections that are due to specification mismatches.

Provided below are some examples of simple rules to illustrate how compilation rules can be written in a theorem prover. For this example, the MetaPRL thereom prover was used. As understood by those skilled in the art, one cannot in general have a formal proof of the property App A is not malicious. Thus, any reasoning that says that the app is not malicious contains formal proofs of the lower level properties and informal reasoning why these lower level properties are enough. The framework described herein provides a way to keep the track of these informal steps in its reasoning. So, if an analyst believes that a particular app is not malicious, one can see why he believes it. Provided below are some non-limiting examples of rules that translate informal properties to formal ones. It should be understood that these rules are for illustrative purposes only and that the invention is not intended to be limited thereto.

declare Cs_example!not malicious{'P}

For different applications malicious may mean different things. For example, the analyst may mean that application is not malicious if there are no information flow violations, no plug-in is downloaded and an application does not execute arbitrary code (for example for user input). The following rule states exactly this.

declare no_information_flow_violations{'P}
declare no_plugin_is_downloaded{'P}
declare no_arbitary_code_execution{'P}
rule no_malicious_1 {|intro [ ]|}:
  ⟨Γ⟩⊢'no_information_flow_violations{P}→
  ⟨Γ⟩⊢'no_plugin_is_downloaded{P}→
  ⟨Γ⟩⊢'no_arbitary_code_execution{P}→
  ⟨Γ⟩⊢'not_malicious{P}

Now if an analyst uses this rule, one can see what kind of properties were verified. The following rules specify what it means to say there are no information flow violations.

declare no_covert_channels{'P}
declare no_conventional_information_flow_violations{'P}
rule no_information_flow_violation {|intro [ ]|}:
  ⟨Γ⟩⊢'no covert channels{P}→
  ⟨Γ⟩⊢'no_conventional_information_flow_violations{P}→
  ⟨Γ⟩⊢'no_information_flow_violations{P}
declare no_timing_channels{'P}
declare no_leak_through_global_settings{'P}
rule no covert channels{|intro [ ]|}:
  ⟨Γ⟩⊢'no_timing_channels{P}→
  ⟨Γ⟩⊢'no_leak_through_global_settings{P}→
  ⟨Γ⟩⊢'no_covert_channels{P}

The rules could be modified, for example by adding new conditions (e.g., there can be no race condition in the above rule). Then the proofs that used the modified rule could be rechecked. It is known that if an application does not have access to global settings, then there is no information flow through global settings. This is easily verified by Auto tactic, as follows:

declare no_access_to_global_settings{'P}
rule no_access_to_global_settings {|intro[AutoMustComplete]|}:
  ⟨Γ⟩⊢'no_access_to_global_settings{P}→
  ⟨Γ⟩⊢'no_leak_through_global_settings{P}
rule no_access_to_global_settings_composition {|intro [ ]|}:
  ⟨Γ⟩⊢'no_access_to_global_settings{P}→
  ⟨Γ⟩⊢'no_access_to_global_settings{Q}→
  ⟨Γ⟩⊢'no_access_to_global_settings{composition{P;Q}}

However, sometimes program do have access to global settings. Then the system needs to check that this access is legitimate and does not allow information flow through it. For example, it can be done using the following rule:

declare change_global_setting_only_by_user_request {'P}
rule change_global_setting_only_by_user_request {|intro [ ]|}:
  ⟨Γ⟩⊢'change_global_setting_only_by_user_request{P}→
  ⟨Γ⟩⊢'no_leak_through_global_settings{P}

Examples of some other rules are as follows:

declare no_downloads{'P}
declare output_is_not_plugin{'P}
declare output_is_alphanumeric{'P}
rule no_plugin_is_downloaded {|intro [AutoMustComplete]|}:
  ⟨Γ⟩⊢'no_downloads{P}→
  ⟨Γ⟩⊢'no_plugin_is_downloaded{P}
rule no_downloads_composition {|intro [ ]|}:
  ⟨Γ⟩⊢'no_downloads{P}→
  ⟨Γ⟩⊢'no_downloads{Q}→
  ⟨Γ⟩⊢'no_downloads{composition{P; Q}}
rule plugin_filter {|intro [ ]|}:
  ⟨Γ⟩⊢'no_downloads{P}→
  ⟨Γ⟩⊢'output_is_not_plugin{Q}→
  ⟨Γ⟩⊢'no_plugin_is_downloaded{composition{P; Q}}
rule alphanumeric_plugin_filter {|intro [ ]|}:
  ⟨Γ⟩⊢'output_is_alphanumeric{P}→
  ⟨Γ⟩⊢'output_is_not_plugin{P}

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for translating security objectives of computer software to properties of software code, the system comprising:
   one or more processors and a memory, the memory being a non-transitory computer-readable medium having executable instructions encoded thereon, such that upon execution of the instructions, the one or more processors perform operations of:
   using a set of inference rules, translating a user security objective written in a high-level language into a formal security objective;
   using a hierarchical library, adapting the formal security objective into a low-level property to fit a target program having software code, the hierarchical library being a hierarchical library of security properties and proof rules, where each property is defined at different levels of abstraction from ranging from the formal security objective to machine verifiable properties expressed in first-order propositional logic;
   determining whether the user security objective has been satisfied by analyzing the software code with respect to the low-level property; and
   wherein translating the user security objective into the formal security objective further includes adding annotations to the set of inference rules.

2. The system as set forth in claim 1, wherein the set of inference rules are predefined or from a user supplied library.

3. The system as set forth in claim 2, wherein the set of inference rules are rules for translating properties, rules for proving properties, or rules for compiling software.

4. The system as set forth in claim 3, wherein in using a set of inference rules, the formal security objective is a low-level representation of the user security objectives.

5. The system as set forth in claim 4, wherein determining whether the user security objective has been satisfied includes determining if the set of inference rules lead from the high-level language to the low-level representation.

6. The system as set forth in claim 5, wherein translating the user security objective into the formal security objective and adapting the formal security objective into a low-level property includes translating a high level property into different sets of low-level properties for different target programs.

7. The system as set forth in claim 6, wherein adding annotations to the set of inference rules includes adding an AutoMustComplete rule, designating that if the system does have access to sensitive data that it does not reveal the sensitive data.

8. A computer program product for translating security objectives of computer software to properties of software code, the computer program product comprising:
a non-transitory computer-readable medium having executable instructions encoded thereon, such that upon execution of the instructions by one or more processors, the one or more processors perform operations of:
using a set of inference rules, translating a user security objective written in a high-level language into a formal security objective;
using a hierarchical library, adapting the formal security objective into a low-level property to fit a target program having software code, the hierarchical library being a hierarchical library of security properties and proof rules, where each property is defined at different levels of abstraction from ranging from the formal security objective to machine verifiable properties expressed in first-order propositional logic;
determining whether the user security objective has been satisfied by analyzing the software code with respect to the low-level property; and
wherein translating the user security objective into the formal security objective further includes adding annotations to the set of inference rules.

9. The computer program product as set forth in claim 8, wherein the set of inference rules are predefined or from a user supplied library.

10. The computer program product as set forth in claim 9, wherein the set of inference rules are rules for translating properties, rules for proving properties, or rules for compiling software.

11. The computer program product as set forth in claim 10, wherein in using a set of inference rules, the formal security objective is a low-level representation of the user security objectives.

12. The computer program product as set forth in claim 11, wherein determining whether the user security objective has been satisfied includes determining if the set of inference rules lead from the high-level language to the low-level representation.

13. The computer program product as set forth in claim 12, wherein translating the user security objective into the formal security objective and adapting the formal security objective into a low-level property includes translating a high level property into different sets of low-level properties for different target programs.

14. The computer program product as set forth in claim 13, wherein adding annotations to the set of inference rules includes adding an AutoMustComplete rule, designating that if a system does have access to sensitive data that it does not reveal the sensitive data.

15. A method for translating security objectives of computer software to software code, the method comprising:
causing one or more processors to execute instructions encoded on a non-transitory computer-readable medium, such that upon execution, the one or more processors perform operations of:
using a set of inference rules, translating a user security objective written in a high-level language into a formal security objective;
using a hierarchical library, adapting the formal security objective into a low-level property to fit a target program having software code, the hierarchical library being a hierarchical library of security properties and proof rules, where each property is defined at different levels of abstraction from ranging from the formal security objective to machine verifiable properties expressed in first-order propositional logic;
determining whether the user security objective has been satisfied by analyzing the software code with respect to the low-level property; and
wherein translating the user security objective into the formal security objective further includes adding annotations to the set of inference rules.

16. The method as set forth in claim 15, wherein the set of inference rules are predefined or from a user supplied library.

17. The method as set forth in claim 16, wherein the set of inference rules are rules for translating properties, rules for proving properties, or rules for compiling software.

18. The method as set forth in claim 17, wherein in using a set of inference rules, the formal security objective is a low-level representation of the user security objectives.

19. The method as set forth in claim 18, wherein determining whether the user security objective has been satisfied includes determining if the set of inference rules lead from the high-level language to the low-level representation.

20. The method as set forth in claim 19, wherein translating the user security objective into the formal security objective and adapting the formal security objective into a low-level property includes translating a high level property into different sets of low-level properties for different target programs.

21. The method as set forth in claim 20, wherein adding annotations to the set of inference rules includes adding an AutoMustComplete rule, designating that if a system does have access to sensitive data that it does not reveal the sensitive data.

* * * * *